(12) United States Patent
Lee et al.

(10) Patent No.: US 9,866,832 B2
(45) Date of Patent: *Jan. 9, 2018

(54) METHOD AND APPARATUS FOR ENCODING/DECODING IMAGE USING TRANSFORM SKIP FLAG

(71) Applicant: KT CORPORATION, Kyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Kyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,091

(22) Filed: Feb. 15, 2016

(65) Prior Publication Data

US 2016/0165253 A1 Jun. 9, 2016

Related U.S. Application Data

(63) Continuation of application No. 14/605,302, filed on Jan. 26, 2015, now Pat. No. 9,300,974, which is a (Continued)

(30) Foreign Application Priority Data

Oct. 19, 2011 (KR) ........................ 10-2011-0107098

(51) Int. Cl.
*H04N 19/44* (2014.01)
*H04N 19/61* (2014.01)
(Continued)

(52) U.S. Cl.
CPC ......... *H04N 19/107* (2014.11); *H04N 19/103* (2014.11); *H04N 19/105* (2014.11);
(Continued)

(58) Field of Classification Search
CPC .. H04N 19/103; H04N 19/105; H04N 19/107; H04N 19/11; H04N 19/12;
(Continued)

(56) References Cited

U.S. PATENT DOCUMENTS 6,563,953 B2 5/2003 Lin et al.
6,735,345 B2 5/2004 Lin et al.
(Continued)

FOREIGN PATENT DOCUMENTS

CN 1589017 A 3/2005
CN 1939066 A 3/2007
(Continued)

OTHER PUBLICATIONS

Weijia Zhu et al., "Inter modes for screen content coding", Joint Collaborative Team on Video Coding (JCT-VC) of ITU-T S16 WP3 and ISO/IEC JTC1/SC29/WG11 6th Meeting: Torino, Jul. 14-22, 2011, Document JCTVC-F150.
(Continued)

*Primary Examiner* — Francis G Geroleo
(74) *Attorney, Agent, or Firm* — IP Legal Services, LLC

(57) ABSTRACT

Provided is a method for decoding an image. The method may include: deciding a prediction mode that corresponds to a chroma component block; deciding a transform skip mode of the chroma component block from a plurality of transform skip mode candidates, according to the prediction mode that corresponds to the chroma component block; and reverse-transforming the chroma component block on the basis of the transform skip mode that is decided.

4 Claims, 8 Drawing Sheets

Related U.S. Application Data continuation of application No. 14/352,801, filed as application No. PCT/KR2012/008481 on Oct. 17, 2012, now Pat. No. 9,300,973.

(51) Int. Cl.
| | | |
|---|---|---|
| *H04N 19/124* | (2014.01) | |
| *H04N 19/593* | (2014.01) | |
| *H04N 19/176* | (2014.01) | |
| *H04N 19/136* | (2014.01) | |
| *H04N 19/107* | (2014.01) | |
| *H04N 19/159* | (2014.01) | |
| *H04N 19/122* | (2014.01) | |
| *H04N 19/11* | (2014.01) | |
| *H04N 19/103* | (2014.01) | |
| *H04N 19/12* | (2014.01) | |
| *H04N 19/186* | (2014.01) | |
| *H04N 19/105* | (2014.01) | |
| *H04N 19/139* | (2014.01) | |
| *H04N 19/18* | (2014.01) | |
| *H04N 19/13* | (2014.01) | |
| *H04N 19/42* | (2014.01) | |
| *H04N 19/182* | (2014.01) | |

(52) U.S. Cl.
CPC .......... *H04N 19/11* (2014.11); *H04N 19/12* (2014.11); *H04N 19/122* (2014.11); *H04N 19/124* (2014.11); *H04N 19/13* (2014.11); *H04N 19/136* (2014.11); *H04N 19/139* (2014.11); *H04N 19/159* (2014.11); *H04N 19/176* (2014.11); *H04N 19/18* (2014.11); *H04N 19/186* (2014.11); *H04N 19/439* (2014.11); *H04N 19/44* (2014.11); *H04N 19/593* (2014.11); *H04N 19/61* (2014.11); *H04N 19/182* (2014.11)

(58) Field of Classification Search
CPC .. H04N 19/122; H04N 19/124; H04N 19/136; H04N 19/139; H04N 19/159; H04N 19/176; H04N 19/18; H04N 19/186; H04N 19/44; H04N 19/593; H04N 19/61
USPC .................................................. 375/240.12
See application file for complete search history.

(56) References Cited

U.S. PATENT DOCUMENTS

| | | | |
|---|---|---|---|
| 7,054,494 B2 | 5/2006 | Lin et al. | |
| 7,127,114 B2 | 10/2006 | Lin et al. | |
| 7,289,673 B2 | 10/2007 | Lin et al. | |
| 7,929,608 B2 | 4/2011 | Krishnan | |
| 8,290,288 B2 | 10/2012 | Lin et al. | |
| 8,582,903 B2 | 11/2013 | Lin et al. | |
| 8,923,406 B2 | 12/2014 | Mrak et al. | |
| 2004/0013308 A1 | 1/2004 | Jeon et al. | |
| 2006/0013506 A1 | 1/2006 | Song et al. | |
| 2006/0215768 A1* | 9/2006 | Kerofsky | H04N 19/176 375/240.28 |
| 2006/0262981 A1 | 11/2006 | Jeon et al. | |
| 2006/0291556 A1* | 12/2006 | Watanabe | H04N 19/176 375/240.03 |
| 2007/0211798 A1 | 9/2007 | Boyce et al. | |
| 2007/0237224 A1 | 10/2007 | Krishnan | |
| 2008/0037636 A1 | 2/2008 | Jeon et al. | |
| 2008/0037645 A1 | 2/2008 | Jeon et al. | |
| 2008/0037646 A1 | 2/2008 | Jeon et al. | |
| 2008/0037885 A1 | 2/2008 | Jeon et al. | |
| 2008/0037886 A1 | 2/2008 | Jeon et al. | |
| 2008/0043849 A1 | 2/2008 | Jeon et al. | |
| 2008/0044093 A1 | 2/2008 | Jeon et al. | |
| 2008/0044094 A1 | 2/2008 | Jeon et al. | |
| 2008/0170615 A1 | 7/2008 | Sekiguchi et al. | |
| 2008/0181304 A1 | 7/2008 | Sekiguchi et al. | |
| 2008/0304567 A1 | 12/2008 | Boyce et al. | |
| 2009/0003435 A1 | 1/2009 | Cho et al. | |
| 2009/0238271 A1 | 9/2009 | Kim et al. | |
| 2011/0032990 A1 | 2/2011 | Choi et al. | |
| 2011/0090954 A1* | 4/2011 | Cohen | H04N 19/197 375/240.03 |
| 2011/0158521 A1 | 6/2011 | Park et al. | |
| 2011/0255591 A1 | 10/2011 | Kim et al. | |
| 2012/0008683 A1 | 1/2012 | Karczewicz et al. | |
| 2012/0170649 A1 | 7/2012 | Chen et al. | |
| 2012/0201303 A1 | 8/2012 | Yang et al. | |
| 2012/0307893 A1* | 12/2012 | Reznik | G10L 19/0212 375/240.12 |
| 2013/0003838 A1 | 1/2013 | Gao et al. | |
| 2013/0003839 A1 | 1/2013 | Gao et al. | |
| 2013/0156108 A1 | 6/2013 | Jeon et al. | |
| 2013/0163672 A1 | 6/2013 | Jeon et al. | |
| 2013/0188721 A1 | 7/2013 | Jeon et al. | |
| 2013/0188722 A1 | 7/2013 | Jeon et al. | |
| 2013/0195192 A1 | 8/2013 | Jeon et al. | |
| 2013/0202045 A1 | 8/2013 | Jeon et al. | |
| 2013/0202046 A1 | 8/2013 | Jeon et al. | |
| 2013/0208800 A1 | 8/2013 | Jeon et al. | |
| 2013/0208993 A1 | 8/2013 | Jeon et al. | |
| 2014/0105297 A1 | 4/2014 | Jeon et al. | |
| 2014/0254674 A1 | 9/2014 | Lee et al. | |
| 2015/0030077 A1 | 1/2015 | Jeon et al. | |
| 2015/0030078 A1 | 1/2015 | Jeon et al. | |
| 2015/0030079 A1 | 1/2015 | Jeon et al. | |
| 2015/0030080 A1 | 1/2015 | Jeon et al. | |
| 2015/0139300 A1 | 5/2015 | Lee et al. | |
| 2016/0165254 A1 | 6/2016 | Lee et al. | |
| 2016/0381362 A1 | 12/2016 | Lee et al. | |

FOREIGN PATENT DOCUMENTS

| | | |
|---|---|---|
| CN | 101222644 A | 7/2008 |
| CN | 100512444 C | 7/2009 |
| CN | 102045560 A | 5/2011 |
| CN | 104067617 A | 9/2014 |
| JP | 2002-532029 A | 9/2002 |
| JP | 2009-224854 A | 10/2009 |
| JP | 2009-272727 A | 11/2009 |
| KR | 10-2008-0064354 A | 7/2008 |
| KR | 10-2008-0114388 A | 12/2008 |
| KR | 10-2011-0078498 A | 7/2011 |
| RU | 2419246 C1 | 5/2011 |
| WO | 2011/016678 A2 | 2/2011 |

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E603.
Andrea Gabriellini et al., "Spatial Transform Skip in the Emerging High Efficiency Video Coding Standard", IEEE, Sep. 30-Oct. 3, 2012, 2012 19th IEEE International Conference on Image Processing (ICIP), pp. 185-188.
Marta Mrak et al., "Transform skip mode", Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G575.
Marta Mrak et al., "Transform skip mode", Joint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F077.
Marta Mrak et al., "Transform skip mode", Joint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F077_r1.
Hiroya Nakamura et al., "Coding order of luma and chroma intra prediction modes", Joint Collaborative Team on Video Coding

(56) References Cited

OTHER PUBLICATIONS (JCT-VC) of ITU-T SG16 WP3 and ISO/IEC JTC1/SC29/WG11 6th Meeting: Torino, IT, Jul. 14-22, 2011, Document: JCTVC-F094.

\* cited by examiner

METHOD AND APPARATUS FOR ENCODING/DECODING IMAGE USING TRANSFORM SKIP FLAG

CROSS REFERENCE TO RELATED APPLICATIONS

The application is a Continuation of U.S. patent application Ser. No. 14/605,302 (filed on Jan. 26, 2015), which is a Continuation of U.S. patent application Ser. No. 14/352,801 (filed on Apr. 18, 2014), which is a National Stage Patent Application of PCT International Patent Application No. PCT/KR2012/008481 (filed on Oct. 17, 2012) under 35 U.S.C. §371, which claims priority to Korean Patent Application No. 10-2011-0107098 (filed on Oct. 19, 2011), the teachings of which are incorporated herein in their entireties by reference.

TECHNICAL FIELD

The present invention relates to video processing, and more particularly, to a method and an apparatus for transforming video.

BACKGROUND ART

Recently, demands for high-resolution and high-quality videos, such as high-definition (HD) and ultrahigh-definition (UHD) videos, are increasing.

To provide videos with higher resolution and higher quality, the amount of video data increases. Accordingly, costs of transmitting and storing video data rise so as to provide high-quality videos as compared with conventional video data processing methods. In order to solve these problems occurring according to an increase in resolution and quality of video data, high-efficiency video compression techniques may be utilized.

For video data compression, various technical schemes are used such as inter prediction which predicts pixel values included in a current picture from other pictures, intra prediction which predicts pixel values included in a current picture using information on other pixels within the current picture, and entropy encoding/decoding method which allocates shorter codes to frequently occurring or appearing signals.

DISCLOSURE

Technical Problem

An aspect of the present invention is to provide a video encoding method and a video encoding apparatus for increasing video encoding performance.

Another aspect of the present invention is to provide a video decoding method and a video decoding apparatus for increasing video decoding performance.

Still another aspect of the present invention is to provide a transform method and a transform apparatus for increasing video encoding performance.

Yet another aspect of the present invention is to provide an inverse transform method and an inverse transform apparatus for increasing video decoding performance.

Technical Solution

An embodiment of the present invention provides a video decoding method. The video decoding method may include determining a prediction mode corresponding to a chroma component block, determining a transform skip mode (TSM) of the chroma component block, among a plurality of transform skip mode candidates, based on the prediction mode corresponding to the chroma component block; and performing inverse transform on the chroma component block based on the determined transform skip mode. The plurality of transform skip mode candidates may comprise at least one of a 2-directional (2D) transform mode which performs both horizontal transform and vertical transform, a horizontal transform mode which performs horizontal transform, a vertical transform mode which performs vertical transform and a non-transform mode which does not perform transform.

When the prediction mode corresponding to the chroma component block is an inter mode, the determining of the transform skip mode of the chroma component block may include determining a transform skip mode of a luma component block corresponding to the chroma component block as the transform skip mode of the chroma component block.

When the prediction mode corresponding to the chroma component block is an intra mode, the determining of the transform skip mode of the chroma component block may include determining an intra prediction mode of the chroma component block, and determining a transform skip mode of the chroma component block based on the determined intra prediction mode.

When the determined intra prediction mode of the chroma component block is a DM mode, the determining of the transform skip mode of the chroma component block may include determining a transform skip mode of a luma component block corresponding to the chroma component block as the transform skip mode of the chroma component block, and the DM mode may be a mode in which an intra prediction mode of the luma component block is used as the intra prediction mode of the chroma component block.

When the determined intra prediction mode of the chroma component block is a horizontal mode, the plurality of transform skip mode candidates may include the 2D transform mode, the vertical transform mode and the non-transform mode except for the horizontal transform mode.

When the determined intra prediction mode of the chroma component block is a vertical mode, the plurality of transform skip mode candidates may include the 2D transform mode, the horizontal transform mode and the non-transform mode except for the vertical transform mode.

When the determined intra prediction mode of the chroma component block is a DC mode, the plurality of transform skip mode candidates may include the 2D transform mode and the non-transform mode except for the horizontal transform mode and the vertical transform mode.

When the determined intra prediction mode of the chroma component block is an LM mode, the plurality of transform skip mode candidates may include the 2D transform mode and the non-transform mode except for the horizontal transform mode and the vertical transform mode, and the LM mode may be a mode in which a predicted pixel value of a chroma component is determined based on a pixel value of a luma component.

Another embodiment of the present invention provides a video decoding apparatus. The video decoding apparatus may include a prediction module configured to determine a prediction mode corresponding to a chroma component block, and an inverse transform module configured to determine a transform skip mode (TSM) of the chroma component block, among a plurality of transform skip mode candidates, based on the prediction mode corresponding to the chroma component block and to perform inverse transform on the chroma component block based on the determined transform skip mode. The plurality of transform skip mode candidates may include at least one of a 2-directional (2D) transform mode which performs both horizontal transform and vertical transform, a horizontal transform mode which performs horizontal transform, a vertical transform mode which performs vertical transform and a non-transform mode which does not perform transform.

Still another embodiment of the present invention provides a video encoding method. The video encoding method may include determining a prediction mode corresponding to a chroma component block, determining a transform skip mode (TSM) of the chroma component block, among a plurality of transform skip mode candidates, based on the prediction mode corresponding to the chroma component block, and performing transform on the chroma component block based on the determined transform skip mode. The plurality of transform skip mode candidates may include at least one of a 2-directional (2D) transform mode which performs both horizontal transform and vertical transform, a horizontal transform mode which performs horizontal transform, a vertical transform mode which performs vertical transform and a non-transform mode which does not perform transform.

When the prediction mode corresponding to the chroma component block is an inter mode, the determining of the transform skip mode of the chroma component block may include determining a transform skip mode of a luma component block corresponding to the chroma component block as the transform skip mode of the chroma component block.

When the prediction mode of the chroma component block is an intra mode, the determining of the transform skip mode of the chroma component block may include determining an intra prediction mode of the chroma component block, and determining a transform skip mode of the chroma component block based on the determined intra prediction mode.

When the determined intra prediction mode of the chroma component block is a DM mode, the determining of the transform skip mode of the chroma component block may include determining a transform skip mode of a luma component block corresponding to the chroma component block as the transform skip mode of the chroma component block, and the DM mode may be a mode in which an intra prediction mode of the luma component block is used as the intra prediction mode of the chroma component block.

When the determined intra prediction mode of the chroma component block is a horizontal mode, the plurality of transform skip mode candidates may include the 2D transform mode, the vertical transform mode and the non-transform mode except for the horizontal transform mode.

When the determined intra prediction mode of the chroma component block is a vertical mode, the plurality of transform skip mode candidates may include the 2D transform mode, the horizontal transform mode and the non-transform mode except for the vertical transform mode.

When the determined intra prediction mode of the chroma component block is a DC mode, the plurality of transform skip mode candidates may include the 2D transform mode and the non-transform mode except for the horizontal transform mode and the vertical transform mode.

When the determined intra prediction mode of the chroma component block is an LM mode, the plurality of transform skip mode candidates may include the 2D transform mode and the non-transform mode except for the horizontal transform mode and the vertical transform mode, and the LM mode may be a mode in which a predicted pixel value of a chroma component is determined based on a pixel value of a luma component.

Yet another embodiment of the present invention provides a video encoding apparatus. The video encoding apparatus may include a prediction module configured to determine a prediction mode corresponding to a chroma component block, and a transform module configured to determine a transform skip mode (TSM) of the chroma component block, among a plurality of transform skip mode candidates, based on the prediction mode corresponding to the chroma component block and to perform transform on the chroma component block based on the determined transform skip mode. The plurality of transform skip mode candidates may include at least one of a 2-directional (2D) transform mode which performs both horizontal transform and vertical transform, a horizontal transform mode which performs horizontal transform, a vertical transform mode which performs vertical transform and a non-transform mode which does not perform transform.

Advantageous Effects

According to a video encoding method of the present invention, video encoding performance may be enhanced.

According to a video decoding method of the present invention, video decoding performance may be enhanced.

According to a transform/inverse transform method of the present invention, video encoding/decoding performance may be enhanced.

MODE FOR INVENTION

Figure 1:
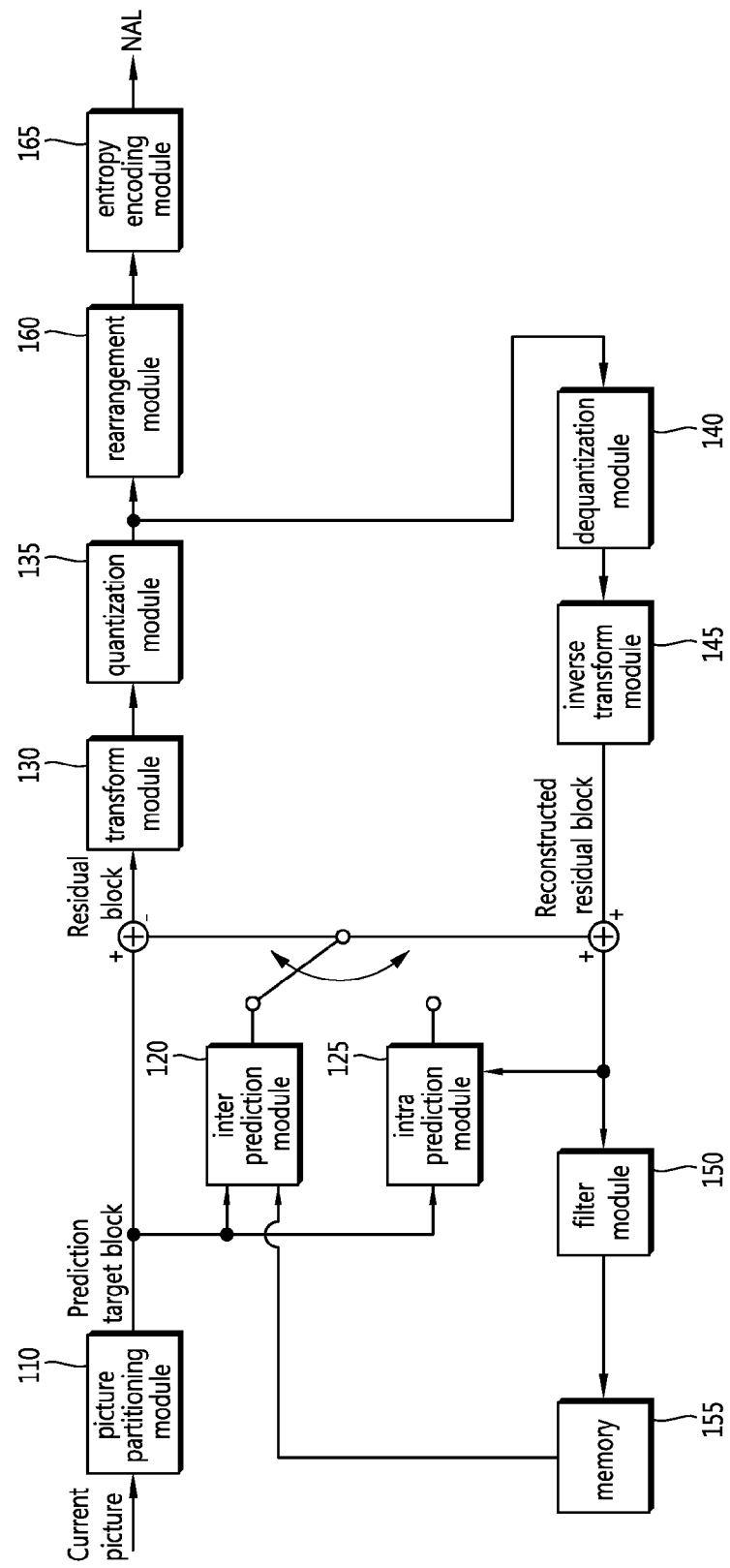
FIG. 1 is a block diagram illustrating a configuration of a video encoding apparatus according to an exemplary embodiment of the present invention.

Although elements illustrated in the drawings are independently shown so as to represent different distinctive functions in a video encoding apparatus/decoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a configuration of a video encoding apparatus according to an exemplary embodiment of the present invention. Referring to FIG. 1, the video encoding apparatus may include a picture partitioning module 110, an inter prediction module 120, an intra prediction module 125, a transform module 130, a quantization module 135, a dequantization module 140, an inverse transform module 145, a filter module 150, a memory 155, a rearrangement module 160 and an entropy encoding module 165.

The picture partitioning module 110 may partition a current input picture into one or more coding units. A coding unit (CU) is a unit of encoding processing in the video encoding apparatus and may be recursively partitioned with depth information based on a quad tree structure. A CU may have different sizes of 8×8, 16×16, 32×32 and 64×64. A CU with a maximum size may be referred to as a largest coding unit (LCU), and a CU with a minimum size as a smallest coding unit (SCU).

Further, the picture partitioning module 110 may partition a CU to generate a prediction unit (PU) and a transform unit (TU). A PU may be smaller than or the same as a CU, and may not necessarily be a square block but be a rectangular block.

Generally, intra prediction may be performed by a unit of 2N*2N or N*N blocks. Here, N is a natural number representing a number of pixels, and 2N*2N or N*N may represent a PU size (and/or partition mode). Further, inter prediction may be performed by a unit of 2N*2N, 2N*N, N*2N or N*N blocks. Here, N is a natural number representing a number of pixels, and 2N*2N, 2N*N, N*2N or N*N may represent a PU size (and/or partition mode). Further, inter prediction may be performed by a unit of 2N×nU, 2N×nD, nL×2N or nR×2N PUs, in addition to the 2N*2N, 2N*N, N*2N or N*N PUs, in order to enhance efficiency in inter prediction. Here, 2N×nU, 2N×nD, nL×2N or nR×2N may represent a PU size (and/or partition mode). In 2N×nU and 2N×nD partition modes, a PU may have a size of 2N×(½)N or 2N×(3/2)N, while in nL×2N and nR×2N partition modes, a PU may have a size of (½)N×2N or (3/2)N×2N.

In an inter prediction mode, the inter prediction module 120 may perform motion estimation (ME) and motion compensation (MC). The inter prediction module 120 may generate a prediction block based on information on at least one of previous and subsequent pictures of the current picture.

The inter prediction module 120 may perform motion estimation based on a partitioned prediction target block and at least one reference block stored in the memory 155. The inter prediction module 120 may generate motion information including a motion vector (MV), a reference block index and a prediction mode as a result of motion estimation.

Further, the inter prediction module 120 may perform motion compensation using the motion information and the reference block. Here, the inter prediction module 120 may generate and output a prediction block corresponding to the input block from the reference block.

In an intra prediction mode, the intra prediction module 125 may generate a prediction block based on information on a pixel within the current picture. In the intra prediction mode, the intra prediction module 125 may perform prediction for a current block based on a prediction target block and a reconstructed block previously reconstructed via transformation and quantization. Here, the reconstructed block may be a reconstructed picture that has not been performed filtering.

In the inter prediction mode or intra prediction mode described above, prediction may be performed on a prediction target block to generate a prediction block. Here, a residual block may be generated based on a differential value between the prediction target block and the generated prediction block.

The transform module 130 may transform a residual block by each TU to generate a transform coefficient. A TU may have a tree structure within maximum and minimum sizes. It may be indicated through a flag whether a current block is partitioned into sub-blocks by each TU. The transform module 130 may perform transform using a discrete cosine transform (DCT) and/or discrete sine transform (DST).

The quantization module 135 may quantize coefficient transformed by the transform module 130. A quantization coefficient may change according to a block or importance of a picture. The quantized transform coefficient may be provided to the rearrangement module 160 and the dequantization module 140.

The rearrangement module 160 may arrange a two-dimensional block of the quantized transform coefficients into a one-dimensional vector of transform coefficients by scanning so as to enhance entropy encoding efficiency. The rearrangement module 160 may change scanning order based on stochastic statistics so as to enhance entropy encoding efficiency.

The entropy encoding module 165 may entropy-encode the values obtained by the rearrangement module 160. In entropy encoding, a more frequently occurring syntax element value may be allocated a codeword of smaller bit numbers, while a less frequently occurring syntax element value may be allocated a codeword of more bit numbers. Thus, a size of a bit string for symbols to be encoded may be reduced to enhance video encoding compression performance. Various encoding methods, such as exponential Golomb coding, context-adaptive variable length coding (CAVLC) and/or context-adaptive binary arithmetic coding (CABAC), may be used for entropy encoding. The encoded information may be formed into a compressed bitstream and be transmitted through a network abstraction layer (NAL) or stored.

The dequantization module 140 may dequantize the transform coefficients quantized by the quantization module 135, and the inverse transform module 145 may inverse-transform the dequantized transform coefficients to generate a reconstructed residual block. The reconstructed residual block may be merged with the prediction block generated by the inter prediction module 120 or the intra prediction module 125 to generate a reconstructed block. The reconstructed block may be provided to the intra prediction module 125 and the filter module 150.

The filter module 150 may filter the reconstructed residual block using a deblocking filter, a sample adaptive offset (SAO) and/or an adaptive loop filter (ALF). The deblocking filter may filter the reconstructed block so as to remove a distortion on boundaries between blocks occurring in encoding and decoding. The SAO is a loop filtering process to be performed on the residual block to which the deblocking filter is applied to compensate an offset difference from an original picture by a pixel. A band offset and an edge offset may be applied through the SAO. The band offset may divide a pixel into 32 bands according to intensity and apply offsets to two divided groups of 16 bands on an edge area and 16 bands in a central area. The ALF may perform filtering so as to minimize an error between the prediction target block and the finally reconstructed block. The ALF may perform filtering based on a value obtained by comparing the reconstructed block filtered by the deblocking filter with the current prediction target block, and filter coefficient information on the ALF may be loaded onto a slice header and transmitted from the encoding apparatus to the decoding apparatus.

The memory 155 may store the finally reconstructed block via the filter module 150, and the finally reconstructed block may be provided to the inter prediction module 120 performing inter prediction.

Figure 2:
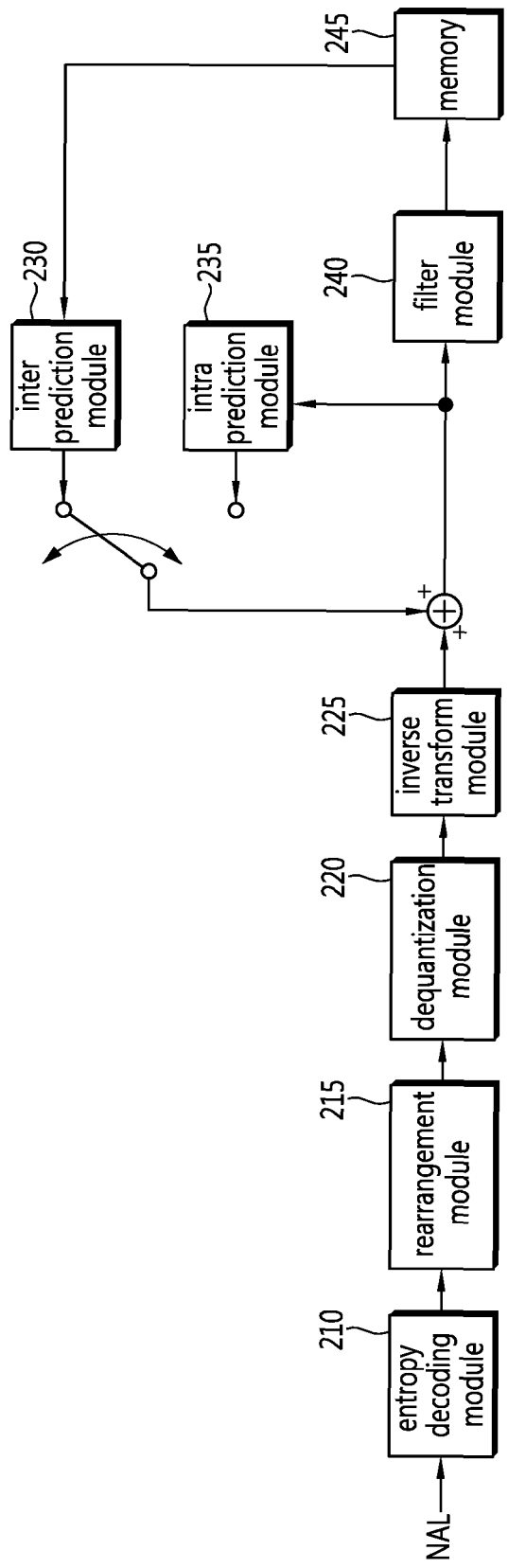
FIG. 2 is a block diagram illustrating a configuration of a video decoding apparatus according to an exemplary embodiment of the present invention.

FIG. 2 is a block diagram illustrating a configuration of a video decoding apparatus according to an exemplary embodiment of the present invention. Referring to FIG. 2, the video decoding apparatus may include an entropy decoding module 210, a rearrangement module 215, a dequantization module 220, an inverse transform module 225, an inter prediction module 230, an intra prediction module 235, a filter module 240 and a memory 245.

The entropy decoding module 210 may receive a compressed bitstream with an NAL. The entropy decoding module 210 may entropy-decode the received bitstream, and also entropy-decode a prediction mode and motion vector information if the bitstream includes the prediction mode and the motion vector information. When entropy decoding is used, a more frequently occurring syntax element value may be allocated a codeword of smaller bit numbers, while a less frequently occurring syntax element value may be allocated a codeword of more bit numbers. Thus, a size of a bit string for symbols to be encoded may be reduced to enhance video encoding compression performance.

An entropy-decoded transform coefficient or residual signal may be provided to the rearrangement module 215. The rearrangement module 215 may inverse-scan the decoded transform coefficient or residual signal to generate a 2D block of transform coefficients.

The dequantization module 220 may dequantize the rearranged transform coefficients. The inverse transform module 225 may inverse-transform the dequantized transform coefficients to generate a residual block.

The residual block may be merged with a prediction block generated by the inter prediction module 230 or intra prediction module 235 to generate a reconstructed block. The reconstructed block may be provided to the intra prediction module 235 and the filter module 240. The inter prediction module 230 and the intra prediction module 235 performs operations which are same as or equivalent to those of the inter prediction module 120 and the intra prediction module 125 of the video encoding apparatus, and thus descriptions thereof will be omitted herein.

The filter module 240 may filter the reconstructed block using a deblocking filter, an SAO and/or an ALF. The deblocking filter may filter the reconstructed block to remove a distortion on a boundary between blocks that occurs in encoding and decoding. The SAO may be applied to the reconstructed block filtered by the deblocking filter by a unit of a pixel to reduce a difference from an original picture. The ALF may filter the reconstructed block via the SAO so as to minimize an error between the prediction target block and the finally reconstructed block.

The memory 245 may store the finally reconstructed block obtained through the filter module 240, and the stored finally reconstructed block may be provided to the inter prediction module 230 performing inter prediction.

Hereinafter, a block may refer to a processing unit for video encoding and decoding. Thus, in this specification, a block may mean a CU, PU or TU.

Generally, a video signal may include signals that specify amount of three primary colors of components of light. The three colors of signals may be represented by red (R), green (G) and blue (B). To reduce a frequency band used for video processing, the R, G and B signals may be transformed into luma and chroma signals equivalent to the R, G and B signals. Here, the video signal may include one luma signal and two chroma signals. Here, the luma signal is a component to represent a luminance of a screen, while the chroma signal is a component to represent a color of the screen. The luma signal may be represented by Y, while the chroma signals may be represented by C.

Since a human eye is sensitive to the luma signal but insensitive to the chroma signals, one picture or block may include a fewer number of pixels of a chroma component than that of pixels of a luma component.

In a 4:2:0 video format, a number of pixels of a chroma component block may be ½ of a number of pixels of a luma component block in a horizontal direction and be ½ of a number of pixels of the luma component in a vertical direction. In a 4:2:2 video format, the number of pixels of the chroma component block may be ½ of the number of pixels of the luma component block in the horizontal direction and be the same as the number of pixels of the luma component in the vertical direction. In a 4:4:4 video format, the number of pixels of the chroma component block may be the same as the number of pixels of the luma component block both in the horizontal direction and in the vertical direction.

As described above with reference to FIGS. 1 and 2, the encoding apparatus may perform transform on a residual block by each TU, and the decoding apparatus may inverse-transform dequantized transform coefficients so as to generate a reconstructed residual block. In the following description, inverse-transform may be also termed "transform" for convenience as necessary, which will be easily understood by a person having ordinary knowledge in the art.

The encoding apparatus and the decoding apparatus may perform 2-directional (2D) transform including both vertical transform and horizontal transform. However, when vertical signal and horizontal signal have remarkably different characteristics, vertical transform or horizontal transform may be skipped. Also, the entire transform process may be skipped for a sparse signal. Such transform methods may reduce complexity in the decoding apparatus and improve encoding efficiency.

In the following description, a transform mode involving both horizontal transform and vertical transform is referred to as a "2D transform mode." A transform mode involving horizontal transform only without vertical transform is referred to as a "horizontal transform mode", and a transform mode involving vertical transform only without horizontal transform is referred to as a "vertical transform mode." Further, a transform mode involving neither horizontal transform nor vertical transform is referred to as a "non-transform mode." Here, the non-transform mode may be also referred to as a "transform bypass mode."

Figure 3:
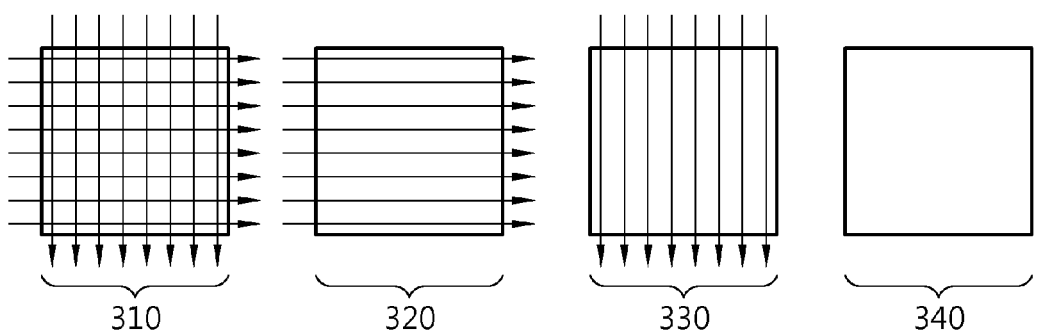
FIG. 3 schematically illustrates a transform method based on a transform mode according to an exemplary embodiment of the present invention.

FIG. 3 schematically illustrates a transform method based on a transform mode according to an exemplary embodiment of the present invention.

Square blocks 310 to 340 shown in FIG. 3 are transform target blocks. Here, the transform target blocks may correspond to TUs and/or CUs. Also, arrows marked on the blocks 310 to 330 may indicate transform directions.

Regarding a transform target block 310, both vertical transform and horizontal transform may be performed. Thus, a transform mode for the transform target block 310 may correspond to the 2D transform mode. Regarding a transform target block 320, horizontal transform only without vertical transform may be performed. Thus, a transform mode for the transform target block 320 may correspond to the horizontal transform mode. In this case, since transform is performed on rows, not on columns, a transform method in the horizontal transform mode may be also referred to as "transform on rows only." Regarding a transform target block 330, vertical transform only without horizontal transform may be performed. Thus, a transform mode for the transform target block 330 may correspond to the vertical transform mode. In this case, since transform is performed on columns, not on rows, a transform method in the vertical transform mode may be also referred to as "transform on columns only." Regarding a transform target block 340, transform may not be performed. Thus, a transform mode for the transform target block 340 may correspond to the non-transform mode.

In the foregoing transform modes, vertical transform and/or horizontal transform may be or may not be skipped. Thus, these transform modes may be also referred to as a transform skip mode (TSM). That is, the transform skip mode may include the 2D transform mode, the horizontal transform mode, the vertical transform mode and the non-transform mode. Accordingly, the 2D transform mode, the horizontal transform mode, the vertical transform mode and/or the non-transform mode may be used as candidates for the transform skip mode for a transform target block.

In one exemplary embodiment, at least one of the 2D transform mode, the horizontal transform mode, the vertical transform mode and the non-transform mode may be used as a transform skip mode candidate for a transform target block. Here, one transform skip mode selected from a plurality of transform skip mode candidates may be applied to one transform target block. The encoding apparatus may select one transform skip mode having a smallest cost value in view of rate-distortion optimization (RDO) among the plurality of transform skip mode candidates. Then, the encoding apparatus may perform transforming on the transform target block based on the selected transform skip mode. That is, the encoding apparatus may apply one selected transform skip mode among the 2D transform mode, the horizontal transform mode, the vertical transform mode and/or the non-transform mode to the transform target block according to the selected transform skip mode.

In addition, the encoding apparatus may encode information on the selected transform skip mode and transmit the information to the decoding apparatus. The transform skip mode may be determined by a unit of CU or TU. Here, when the transform skip mode is determined by a unit of a CU, the information may be transmitted by a unit of a CU. When the transform skip mode is determined by a unit of TU, the information may be transmitted by a unit of TU.

For instance, the information on the transform skip mode may be transmitted to the decoding apparatus by using a transform skip mode index. The transform skip mode index may be an index indicating the transform skip mode to be applied to the transform target block among the transform skip mode candidates. The transform skip mode index may be allocated an index value according to the transform skip mode. Here, the 2D transform mode, the horizontal transform mode and the vertical transform mode may have different index values.

The decoding apparatus may receive the information on the transform skip mode (for example, the encoded transform skip mode index) from the encoding apparatus and decode the information. Here, the decoding apparatus may derive the transform skip mode to be applied to the transform target block based on the decoded information. The decoding apparatus may perform transforming on the transform target block according to the derived transform skip mode. That is, the decoding apparatus may apply one derived transform skip mode among the 2D transform mode, the horizontal transform mode, the vertical transform mode and/or the non-transform mode to the transform target block according to the derived transform skip mode.

Figure 4:
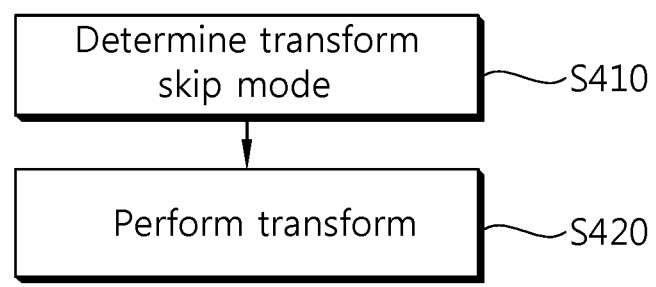
FIG. 4 is a flowchart schematically illustrating a transform process of the encoding apparatus according to an exemplary embodiment of the present invention.

FIG. 4 is a flowchart schematically illustrating a transform process of the encoding apparatus according to an exemplary embodiment of the present invention.

Referring to FIG. 4, the encoding apparatus may determine a transform skip mode for a transform target block among a plurality of transform skip mode candidates (S410). Here, the plurality of transform skip mode candidates may include at least one of the 2D transform mode, the horizontal transform mode, the vertical transform mode and the non-transform mode. Here, the encoding apparatus may select a transform skip mode having a smallest cost value in view of RDO among the plurality of transform skip mode candidates. A method of determining a plurality of transform skip mode candidates and a transform skip mode for a transform target block according to an exemplary embodiment will be described later.

Referring back to FIG. 4, the encoding apparatus may perform transforming on the transform target block according to the determined transform skip mode (S420). That is, the encoding apparatus may apply one selected transform skip mode among the 2D transform mode, the horizontal transform mode, the vertical transform mode and the non-transform mode to the transform target block according to the selected transform skip mode.

Further, the encoding apparatus may encode information on the transform skip mode applied to the transform target block and transmit the information to the decoding apparatus. For example, the information may be transmitted to the decoding apparatus through a transform skip mode index. Here, as described above, considering appearance probabilities of transform skip modes, the encoding apparatus may allocate a short codeword to transform skip mode having high appearance probabilities and a long codeword to a transform skip mode having low appearance probabilities. A method of allocating a codeword to a transform skip mode according to an exemplary embodiment will be described later.

Figure 5:
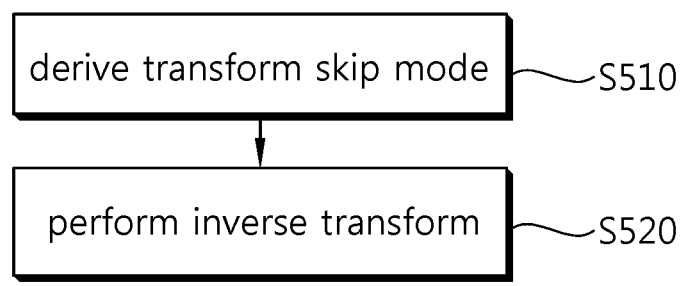
FIG. 5 is a flowchart schematically illustrating an inverse transform process of the decoding apparatus according to an exemplary embodiment of the present invention.

FIG. 5 is a flowchart schematically illustrating an inverse transform process of the decoding apparatus according to an exemplary embodiment of the present invention.

The decoding apparatus may receive a bitstream including the information on the transform skip mode (for example, an encoded transform skip mode index) from the encoding apparatus and decode the bitstream. In the bitstream received from the encoding apparatus, a short codeword may be allocated to a transform skip mode having high appearance probabilities, and a long codeword may be allocated to a transform skip mode having low appearance probabilities. A method of allocating a codeword to a transform skip mode according to an exemplary embodiment will be described later.

Referring to FIG. 5, the decoding apparatus may derive a transform skip mode for an inverse transform target block among a plurality of transform skip mode candidates (S510). Here, the plurality of transform skip mode candidates may include at least one of the 2D transform mode, the horizontal transform mode, the vertical transform mode and the non-transform mode. The decoding apparatus may use the same plurality of transform skip mode candidates as used in the encoding apparatus. Here, the decoding apparatus may derive the transform skip mode for the inverse transform target block based on the decoded information (the information on the transform skip mode, for example, the decoded transform skip mode index). A method of determining a plurality of transform skip mode candidates and a transform skip mode for a transform target block according to an exemplary embodiment will be described in detail.

Referring back to FIG. 5, the decoding apparatus may perform inverse-transforming on the inverse transform target block according to the derived transform skip mode (S520). That is, the decoding apparatus may apply one selected transform skip mode among the 2D transform mode, the horizontal transform mode, the vertical transform mode and/or the non-transform mode to the inverse transform target block according to the selected transform skip mode.

In the embodiments illustrated in FIGS. 4 and 5, the encoding apparatus and the decoding apparatus may use all of the 2D transform mode, the horizontal transform mode, the vertical transform mode and the non-transform mode as transform skip mode candidates for a transform target block having a luma component. Here, the 2D transform mode (and/or a transform skip mode index corresponding to the 2D transform mode), the horizontal transform mode (and/or a transform skip mode index corresponding to the horizontal transform mode), the vertical transform mode (and/or a transform skip mode index corresponding to the vertical transform mode) and/or the non-transform mode (and/or a transform skip mode index corresponding to the non-transform mode) may be allocated different codewords, respectively. In this case, as described above, considering appearance probabilities of transform skip modes, the encoding apparatus may allocate a short codeword to a transform skip mode having high appearance probabilities and a long codeword to a transform skip mode having high appearance probabilities. Table 1 specifies a method of allocating a codeword to a transform skip mode for a transform target block having a luma component according to an exemplary embodiment.

TABLE 1

| TSM | Row transformation | Column transformation | Codeword (CABAC and/or CAVLC) | Note |
|---|---|---|---|---|
| TS0 | O | O | 1 | 2D transform |
| TS1 | O | — | 01 | 1D transform |
| TS2 | — | O | 001 | 1D transform |
| TS3 | — | — | 000 | Non-transform |

In Table 1, TS0 represents the 2D transform mode. TS1 represents the horizontal transform mode, and TS2 represents the vertical transform mode. TS3 represents the non-transform mode. Here, both the horizontal transform mode and the vertical transform mode may correspond to a 1D transform mode.

For example, referring to Table 1, if the 2D transform mode appears most frequently, the 2D transform mode may be allocated a codeword "1." Likewise, according to appearance frequency of a mode, the horizontal transform mode may be allocated a codeword "01," the vertical transform mode a codeword "001," and the non-transform mode a codeword "000."

Even when the vertical transform and/or horizontal transform is skipped depending on transform skip modes, the same quantization matrix may be used as in the 2D transform mode. Further, the encoding apparatus and the decoding apparatus may perform scaling on values in rows and/or columns to be transform skipped, which may be represented by Equation 1.

$$y=(x*\text{scale}+\text{offset})>>\text{shift} \qquad \text{[Equation 1]}$$

Here, x may be an element in a transform skipped row and/or column, and y may be a scaled value. "scale" may be a scaling factor. "offset" may be an offset value applied in scaling, and "shift" may be a bit shift value applied in scaling. Here, "offset" and "shift" may have the same values as an offset value and a bit shift value applied when transform is not skipped, for example, in the 2D transform mode.

Further, in Equation 1, the scaling factor applied to the encoding apparatus and the decoding apparatus may be determined depending on a TU size. In one exemplary embodiment, the scaling factor according to the TU size may be set as listed in Table 2.

TABLE 2

| N | 4 | 8 | 16 | 32 |
|---|---|---|---|---|
| Scale | 128 | 181 | 256 | 362 |

Here, N (and/or N×N) may be a TU size, and scale may be a scaling factor. Referring to Table. 2, when a TU has an 8×8 size, a scaling factor value of 181 may be applied.

While the foregoing embodiments show that a transform skip mode is applied to a transform target block having a luma component (hereinafter, "luma component block"), the present invention is not limited thereto. Alternatively, when transformation is performed on a transform target block having a chroma component (hereinafter, "chroma component block"), a transform skip mode for the transform target block may be determined and transform may be performed based on the determined transform skip mode.

In one exemplary embodiment, it is assumed that a prediction mode for a chroma component block is an inter mode. Characteristics of the chroma component block may be associated with characteristics of a luma component block corresponding to the chroma component block. Thus, in this case, the encoding apparatus and the decoding apparatus may apply, for the chroma component block, the same transform skip mode as used for the luma component block corresponding to the chroma component block. That is, a transform skip mode for the chroma component block may be determined to be the same as the transform skip mode for the luma component block corresponding to the chroma component block.

When the transform skip mode for the luma component block is applied to the chroma component block corresponding to the luma component block, the encoding apparatus may not transmit information on the transform skip mode for the chroma component block (for example, an index of the transform skip mode) to the decoding apparatus. Accordingly, in this case, encoding/decoding performance may be enhanced.

Alternatively in other exemplary embodiment, when a prediction mode for a chroma component block is an intra mode, the encoding apparatus and the decoding apparatus may determine a transform skip mode for the chroma component block based on a prediction direction (and/or intra prediction mode) of the chroma component block. For example, the encoding apparatus and the decoding apparatus may use different methods of determining a transform skip mode candidates and different methods of allocating a codeword to a transform skip mode based on the prediction direction (and/or intra prediction mode) of the chroma component block, which will be described later with reference to FIG. 6.

Figure 6:
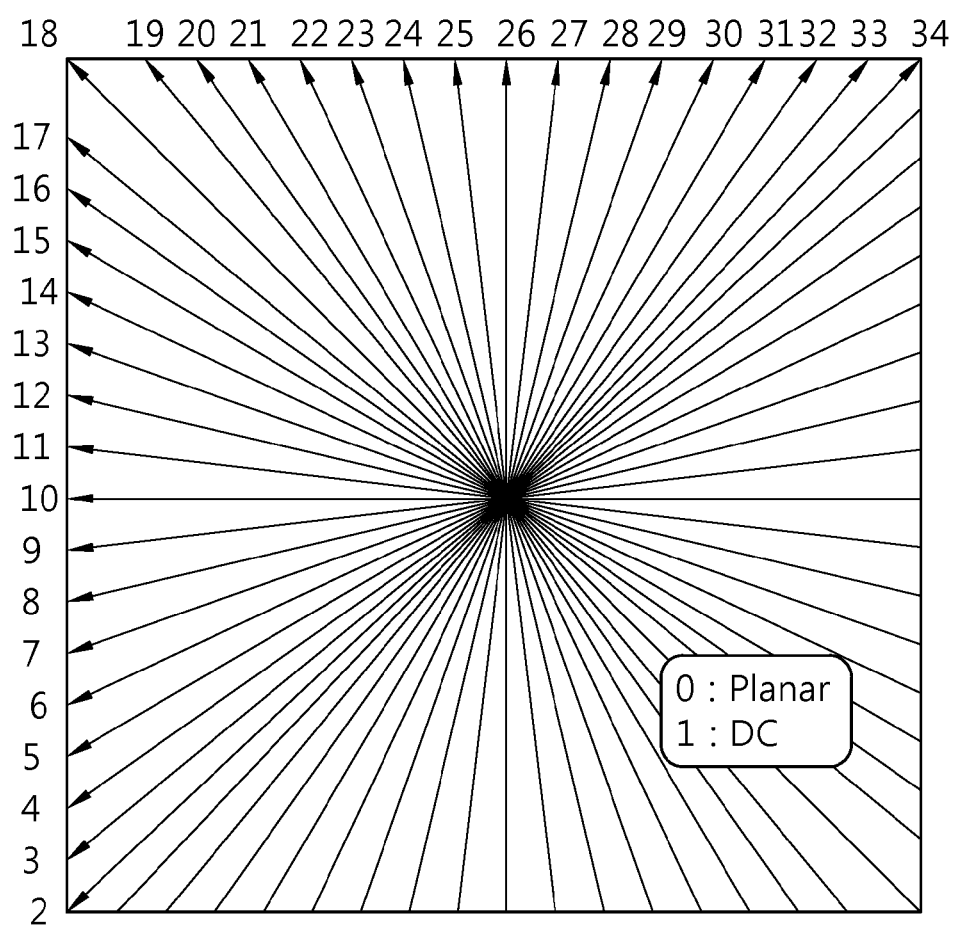
FIG. 6 illustrates a method of determining a transform skip mode of a chroma component block based on an intra prediction mode corresponding to the chroma component block.

FIG. 6 illustrates a method of determining a transform skip mode of a chroma component block based on an intra prediction mode corresponding to the chroma component block.

As described above with reference to FIGS. 1 and 2, the encoding apparatus and the decoding apparatus may generate a prediction block by performing intra prediction based on information on a pixel within a current picture. Intra prediction may be performed according to an intra prediction mode for a prediction target block. The intra prediction mode may include a DC mode, a planar mode, a vertical mode, a horizontal mode and an angular mode. The DC mode and the planar mode are non-directional modes, and the other modes are directional modes. Here, the angular mode may be a directional prediction mode other than the vertical mode and the horizontal mode.

FIG. 6 illustrates a prediction direction of an intra prediction mode and a mode value allocated to each prediction direction. In FIG. 6, intra prediction modes may have different prediction directions, respectively. Numbers allocated to the respective intra prediction modes may be referred to as mode values.

Referring to FIG. 6, an intra prediction mode with a mode value of 0 may be referred to as a planar mode. In the planar mode, reference pixels used for prediction of a prediction target pixel may be determined based on a location of the prediction target pixel in a prediction target block, and a value of the prediction target pixel may be derived based on the determined reference pixels. An intra prediction mode with a mode value of 1 may be referred to as a DC mode, in which a prediction block may be generated using an average pixel value of pixels neighboring to the prediction target block. In an intra prediction mode with a mode value of 26, a vertical direction prediction may be performed based on pixel values of neighboring blocks. Thus, the intra prediction mode with the mode value of 26 may be also referred to as the vertical mode. In an intra prediction mode with a mode value of 10 (horizontal mode), a horizontal direction prediction may be performed based on pixel values of neighboring blocks. Thus, the intra prediction mode with the mode value of 10 may be also referred to as the horizontal mode. In the other modes, prediction may be performed based on pixel values of neighboring blocks according to corresponding angles.

Meanwhile, since a luma component and a chroma component of a picture are associated with each other, an intra prediction mode of the chroma component may be encoded based on a prediction mode of the luma component corresponding to the chroma component, and the decoding apparatus may derive the prediction mode of the chroma component based on the prediction mode of the luma component. Thus, information on the prediction mode of the chroma component transmitted from the encoding apparatus to the decoding apparatus may not be the prediction mode of the chroma component itself, but be a value used for deriving the prediction mode of the chroma component from a relationship with the prediction mode of the luma component. Table 3 specifies a prediction mode of a chroma component determined based on a prediction mode value of a luma component and a value transmitted from the encoding apparatus to the decoding apparatus.

TABLE 3

| intra_chroma_pred_mode[xB][yB] | IntraPredMode[xB][yB] | | | | |
| --- | --- | --- | --- | --- | --- |
| | 0 | 26 | 10 | 1 | X (0 ≤ X < 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | x |

Referring to Table 3, the value transmitted from the encoding apparatus to the decoding apparatus may be a value allocated to intra_chroma_pred_mode. IntraPredMode may represent an intra prediction mode of the luma component. For example, when intra_chroma_pred_mode is 2 and IntraPredMode is 26, the intra prediction mode value of the chroma component may be 10. intra_chroma_pred_mode and IntraPredMode are not limited by terms thereof.

In Table 3, when intra_chroma_pred_mode is 4, the prediction mode of the chroma component may be referred to as a DM mode. Here, the DM mode may mean an intra prediction mode in which the same prediction mode as for the luma component is used for the chroma component.

Further, the encoding apparatus and the decoding apparatus may also use an LM mode for a chroma component block in addition to the intra prediction modes specifies in Table 3. Here, the LM mode may mean an intra prediction mode in which a predicted pixel value of a chroma component is determined according to a pixel value of a luma component. Thus, in the LM mode, directivity of a picture may not be substantial.

Meanwhile, as described above, the encoding apparatus and the decoding apparatus may determine the transform skip mode of the chroma component block based on the prediction direction (and/or intra prediction mode) of the chroma component block.

In one exemplary embodiment, when an intra prediction mode corresponding to the chroma component block is the DM mode, the encoding apparatus and the decoding apparatus may use, for the chroma component block, the same transform skip mode as for the luma component block corresponding to the chroma component block. That is, a transform skip mode of the chroma component block may be determined to be the same as the transform skip mode of the luma component block corresponding to the chroma component block, because the same prediction mode as for the luma component may be used for the chroma component in the DM mode.

Further, appearance probability of each transform skip mode may vary according to an intra prediction mode (and/or prediction direction) of a PU corresponding to the chroma component block. Thus, a different codeword may be allocated to a transform skip mode (and/or transform skip mode index) based on the intra prediction mode (and/or prediction direction) of the PU corresponding to the chroma component block. That is, a codeword allocated to a transform skip mode (and/or transform skip mode index) may be determined based on the intra prediction mode (and/or prediction direction) of the PU corresponding to the chroma component block.

In one exemplary embodiment, when the intra prediction mode corresponding the chroma component block is the horizontal mode, the horizontal transform mode may have a lowest appearance probability among a plurality of transform skip modes. Thus, when the intra prediction mode corresponding to the chroma component block is the horizontal mode, the 2D transform mode, the vertical transform mode and the non-transform mode may be used as transform skip mode candidates except for the horizontal transform mode. In this case, one transform skip mode among the 2D transform mode, the vertical transform mode and the non-transform mode may be applied to the chroma component block. Table 4 specifies a method of allocating codewords to transform skip modes when the 2D transform mode, the vertical transform mode and the non-transform mode are used as transform skip mode candidates according to an exemplary embodiment.

TABLE 4

| TSM | Transform on rows | Transform on columns | Codeword (CABAC and/or CAVLC) | Note |
|---|---|---|---|---|
| TS0 | O | O | 0 | 2D transform |
| TS2 | — | O | 10 | 1D transform |
| TS3 | — | — | 11 | Non-transform |

In Table 4, TS0 represents the 2D transform mode, TS2 represents the vertical transform mode, and TS3 represents the non-transform mode. Here, the vertical transform mode may correspond to a 1D transform mode. Referring to Table 4, when the intra prediction mode corresponding to the chroma component block is the horizontal mode, the 2D transform mode, the vertical transform mode and the non-transform mode may be used as transform skip mode candidates.

In another exemplary embodiment, when the intra prediction mode corresponding to the chroma component block is the vertical mode, the vertical transform mode may have a lowest appearance probability among a plurality of transform skip modes. Thus, when the intra prediction mode corresponding to the chroma component block is the vertical mode, the 2D transform mode, the horizontal transform mode and the non-transform mode may be used as transform skip mode candidates except for the vertical transform mode. In this case, one transform skip mode among the 2D transform mode, the horizontal transform mode and the non-transform mode may be applied to the chroma component block. Table 5 specifies a method of allocating codewords to transform skip modes when the 2D transform mode, the horizontal transform mode and the non-transform mode are used as transform skip mode candidates according to an exemplary embodiment.

TABLE 5

| TSM | Transform on rows | Transform on columns | Codeword (CABAC and/or CAVLC) | Note |
|---|---|---|---|---|
| TS0 | O | O | 0 | 2D transform |
| TS1 | O | — | 10 | 1D transform |
| TS3 | — | — | 11 | Non-transform |

In Table 5, TS0 represents the 2D transform mode, TS1 represents the horizontal transform mode, and TS3 represents the non-transform mode. Here, the horizontal transform mode may correspond to a 1D transform mode. Referring to Table 5, when the intra prediction mode corresponding to the chroma component block is the vertical mode, the 2D transform mode, the horizontal transform mode and the non-transform mode may be used as transform skip mode candidates.

Alternatively in other exemplary embodiment, when the intra prediction mode corresponding to the chroma component block is the DC mode and/or LM mode, directivity of a picture corresponding to the chroma component block may not be substantial. Thus, when the intra prediction mode corresponding to the chroma component block is the DC mode and/or LM mode, the 2D transform mode and the non-transform mode may be used as transform skip mode candidates except for the horizontal transform mode and the vertical transform mode. In this case, one transform skip mode among the 2D transform mode and the non-transform mode may be applied to the chroma component block. Table 6 specifies a method of allocating codewords to transform skip modes when the 2D transform mode and the non-transform mode are used as transform skip mode candidates according to an exemplary embodiment.

TABLE 6

| TSM | Transform on rows | Transform on columns | Codeword (CABAC and/or CAVLC) | Note |
|---|---|---|---|---|
| TS0 | O | O | 0 | 2D transform |
| TS3 | — | — | 1 | Non-transform |

In Table 6, TS0 represents the 2D transform mode and TS3 represents the non-transform mode. Referring to Table 6, when the intra prediction mode corresponding to the chroma component block is the DC mode and/or LM mode, the 2D transform mode and the non-transform mode may be used as transform skip mode candidates.

In the foregoing embodiments, a process of encoding a transform skip mode (and/or transform skip mode index) may be skipped or bit numbers used for encoding transform skip modes (and/or transform skip mode indexes) may be reduced. According to, encoding/decoding performance may be enhanced.

Figure 7:
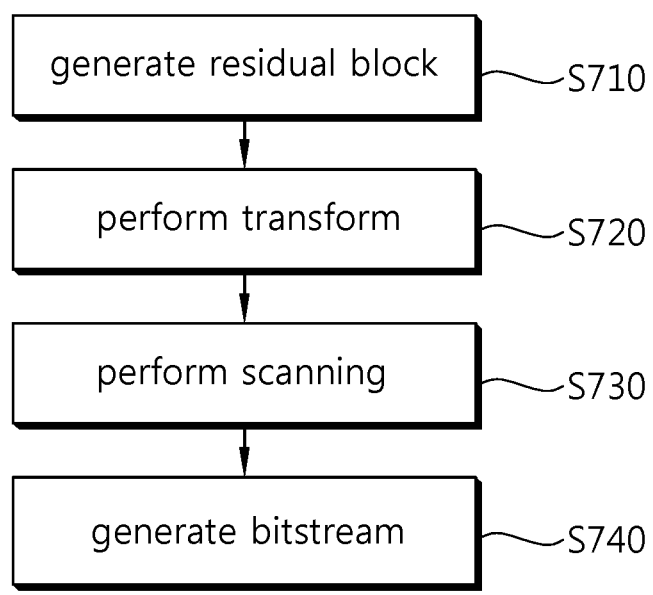
FIG. 7 is a flowchart schematically illustrating an encoding method according to an exemplary embodiment of the present invention.

FIG. 7 is a flowchart schematically illustrating an encoding method according to an exemplary embodiment of the present invention.

Referring to FIG. 7, the encoding apparatus may generate a residual block corresponding to a current block (S710). As described above, the encoding apparatus may perform inter prediction and/or intra prediction on the current block, thereby generating a prediction block corresponding to the current block. Here, the encoding apparatus may generate a residual signal, that is, the residual block, by differentiating by a unit of a pixel between a pixel value of the current block and a pixel value of the prediction block.

In FIG. 7, the encoding apparatus may transform the residual signal, that is, the residual block (S720). The encoding apparatus may transform the residual signal by using a transform kernel, and a size of a transform kernel may be a 2*2, 4*4, 8*8, 16*16, 32*32 or 64*64 size. In one exemplary embodiment, a transform coefficient C for an n*n block may be calculated by Equation 2.

$$C(n,n)=T(n,n) \times B(n,n) \times T(n,n)^T \quad \text{[Equation 2]}$$

Here, C(n,n) is an n*n transform coefficient matrix, T(n,n) is an n*n transform kernel matrix, and B(n,n) is an n*n matrix for a residual block.

When a transform coefficient is generated via transformation, the encoding apparatus may quantize the generated transform coefficient.

It may be determined through RDO which is transmitted one of the residual block and the transform coefficient. When prediction is properly done, the residual block, that is, the residual signal, may be transmitted as itself, without transform encoding. The encoding apparatus may compare cost functions before/after transform encoding and select a method involving minimum costs. Here, the encoding apparatus may transmit information on a type of a signal (residual signal or transform coefficient) signaled with respect to the current block to the decoding apparatus.

Detailed transform processes have been shown in the foregoing embodiments, and thus descriptions thereof are omitted herein.

Referring back to FIG. 7, the encoding apparatus may scan the transform coefficient (S730). Here, as described above, the encoding apparatus may rearrange a two-dimensional block of quantized transform coefficients into a one-dimensional vector of transform coefficients by scanning. Here, the encoding apparatus may change scanning order based on stochastic statistics to enhance entropy encoding efficiency.

When scanning is performed, the encoding apparatus may entropy-encode the scanned transform coefficient and side information (for example, information on an inter prediction mode of the current block) (S740). The encoded information may be formed into a compressed bitstream and be transmitted through an NAL or stored.

Although the encoding method is described with a series of stages based on the flowchart in FIG. 7, the present invention is not limited thereto. Some stages of FIG. 7 may be carried out in different order from described above or in parallel. Further, additional stages may be included between stages in the flowchart, or one or more stages may be deleted from the flowchart of FIG. 7 within the scope of the present invention.

Figure 8:
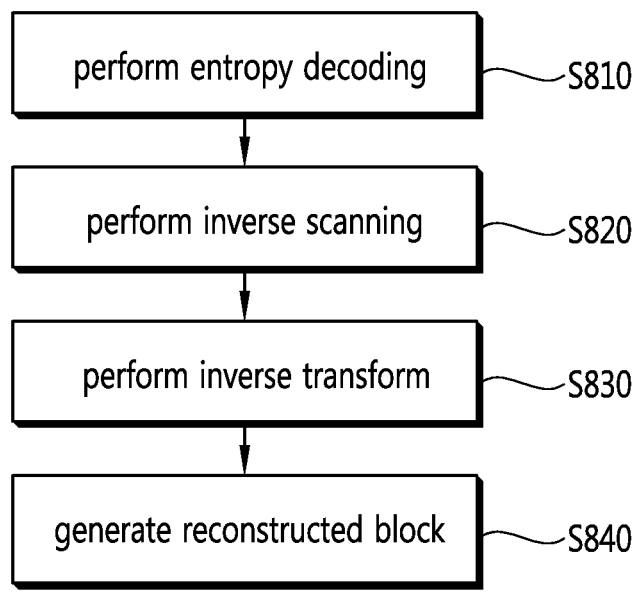
FIG. 8 is a flowchart schematically illustrating a decoding method according to an exemplary embodiment of the present invention.

FIG. 8 is a flowchart schematically illustrating a decoding method according to an exemplary embodiment of the present invention.

Referring to FIG. 8, the decoding apparatus may entropy-decode a bitstream received from the encoding apparatus (S810). For instance, the decoding apparatus may derive a prediction mode and a residual signal of a current block based on a variable length coding (VLC) table and/or CABAC. The decoding apparatus may obtain information on whether a signal received with respect to the current block is the residual signal or a transform coefficient and obtain the residual signal or a 1D vector of transform coefficients for the current block. When the received bitstream includes side information needed for decoding, the side information may be entropy-decoded.

In FIG. 8, the decoding apparatus may inverse-scan the entropy-decoded residual signal or transform coefficients to generate a two-dimensional block (S820). Here, the residual signal may be generated to a residual block, and the transform coefficients may be generated to a two-dimensional block of transform coefficients. When the transform coefficients are generated, the decoding apparatus may dequantize the generated transform coefficients.

Referring back to FIG. 8, the decoding apparatus may inverse-transform the dequantized transform coefficients, thereby generating a residual block (S830). Inverse transformation may be represented by Equation 3.

$$B(n,n)=T(n,n) \times C(n,n) \times T(n,n)^T \quad \text{[Equation 3]}$$

Inverse transformation has been described above, and thus a description thereof is omitted herein.

When the residual block is generated, the decoding apparatus may generate a reconstructed block based on the generated residual block (S840). As described above, the decoding apparatus may perform inter prediction and/or intra prediction on a decoding target block to generate a prediction block corresponding to the decoding target block. Here, the decoding apparatus may add a pixel value of the prediction block and a pixel value of the residual block by a pixel, thereby generating the reconstructed block.

Although the decoding method is described with a series of stages based on the flowchart in FIG. 8, the present invention is not limited thereto. Some stages of FIG. 8 may be carried out in different order from described above or in parallel. Further, additional stages may be included between stages in the flowchart, or one or more stages may be deleted from the flowchart of FIG. 8 within the scope of the present invention.

While methods have been described with a series of stages or blocks based on the flowcharts in the aforementioned embodiments, the present invention is not limited to the foregoing sequence of the stages. Some stages may be carried out in different order from described above or at the same time. Also, it will be understood by those skilled in the art that the stages illustrated in the flowcharts are not exclusive, additional stages may be included in the flowchart, or one or more stages may be deleted from the flowcharts without affecting the scope of the present invention.

The present invention has been described with reference to the exemplary embodiments, and the foregoing embodiments include various aspects of examples. Although all possible combinations may not be mentioned to illustrate various aspects, it will be appreciated by those skilled in the art that changes, modifications and alternatives may be made in these exemplary embodiments without departing from the principles and spirit of be the invention, the scope of which is defined in the appended claims and their equivalents.

The invention claimed is:
1. A method of decoding, based on loss coding, a video signal having a current block to be decoded with a decoding apparatus, comprising:
obtaining, from the video signal, residual coefficients relating to the current block, a first transform skip flag relating to luma components of the current block and a second transform skip flag relating to chroma components of the current block,
wherein the residual coefficients include first residual coefficients relating to the luma components of the current block and second residual coefficients relating to the chroma components of the current block;

performing an inverse-quantization on the first residual coefficients and the second residual coefficients of the current block;

obtaining residual samples of the current block by selectively performing an inverse-transform for first inverse-quantized residual coefficients resulting from the inverse quantization of the first residual coefficients and second inverse-quantized residual coefficients resulting from the inverse-quantization of the second residual coefficients, wherein the first transform skip flag specifies whether the inverse-transform is performed or skipped on the first inverse-quantized residual coefficients resulting from the inverse-quantization of the first residual coefficients, and the second transform skip flag specifies whether the inverse-transform is performed or skipped on the second inverse-quantized residual coefficients resulting from the inverse-quantization of the second residual coefficients, wherein determination of skipping the inverse-transform on the first inverse-quantized residual coefficients is independent with determination of skipping the inverse-transform on the second inverse-quantized residual coefficients, and wherein when the first transform skip flag specifies that the inverse-transform is skipped on the first inverse-quantized residual coefficients, the residual samples of the luma components of the current block is obtained by scaling the first inverse-quantized residual coefficients, and when the second transform skip flag specifies that the inverse-transform is skipped on the second inverse-quantized residual coefficients, the residual samples of the chroma components of the current block is obtained by scaling the second inverse-quantized residual coefficients;

performing an intra prediction or an inter prediction for the current block; and reconstructing the current block by using the residual samples and prediction samples obtained by performing the intra prediction or the inter prediction.

2. The method of claim 1, wherein the inverse-transform includes a transform on rows of the current block and a transform on columns of the current block.

3. The method of claim 2, wherein the inverse-transform is performed by using one of a discrete cosine transform and a discrete sine transform.

4. The method of claim 1, wherein the inter prediction is performed using motion information, the motion information including a motion vector and a reference index.

* * * * *